United States Patent Office 3,613,436
Patented Oct. 19, 1971

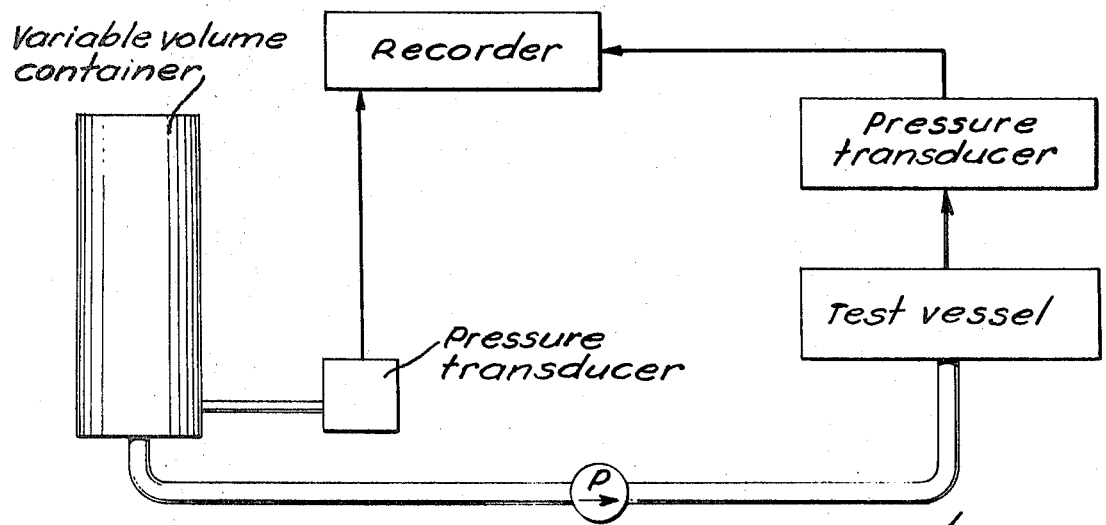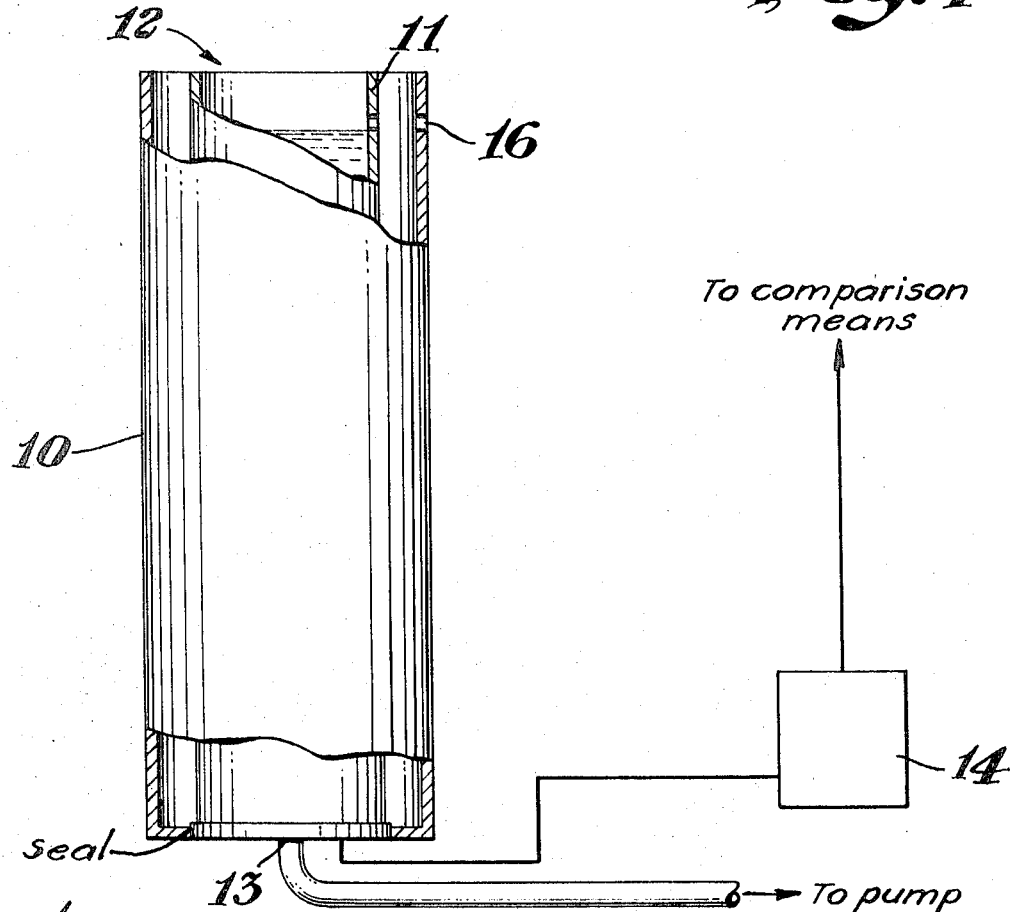

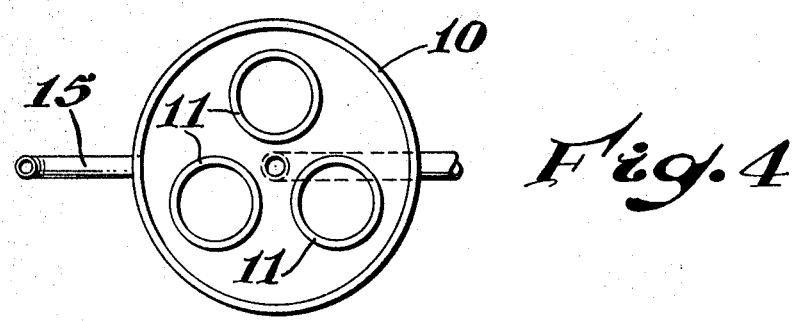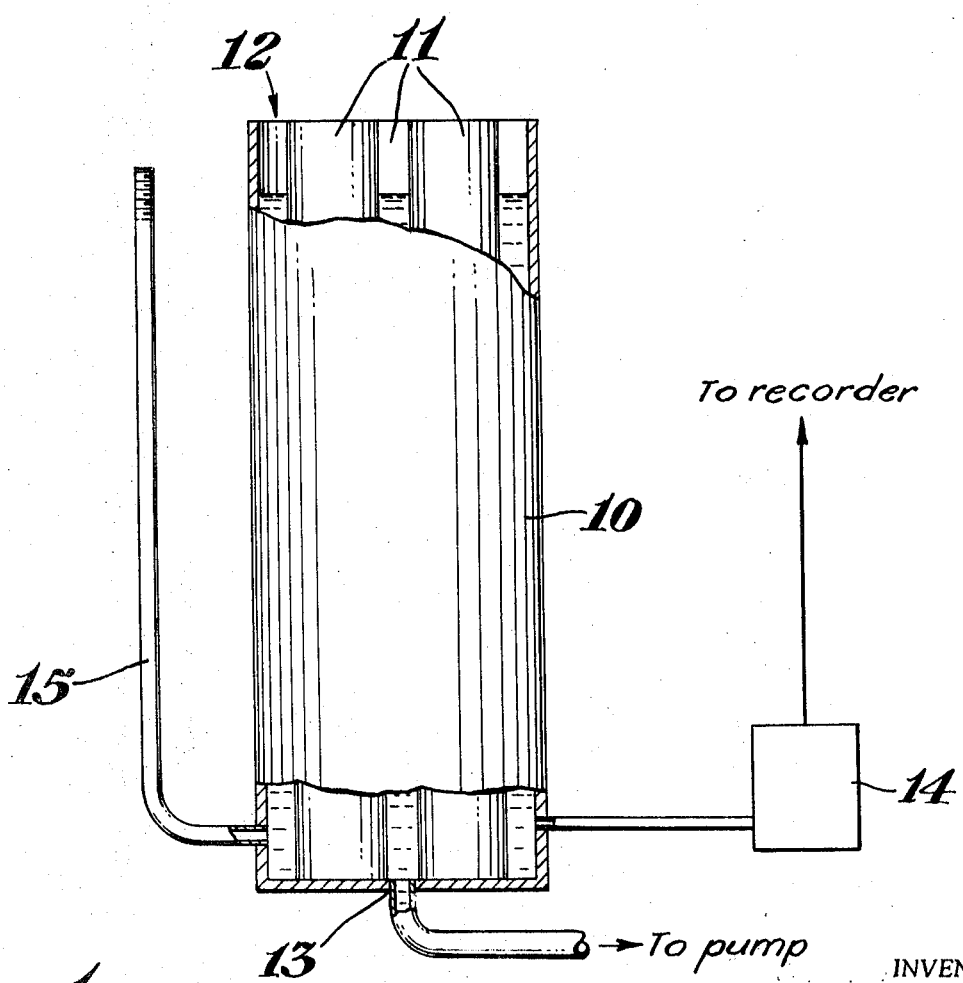

3,613,436
NON-DESTRUCTIVE TESTING OF
PRESSURE VESSELS
Lewis R. Drake and Neil R. Erickson, Midland, Mich.,
assignors to The Dow Chemical Company, Midland,
Mich.
Filed July 28, 1969, Ser. No. 845,349
Int. Cl. G01m 3/02, 19/00
U.S. Cl. 73—37
7 Claims

ABSTRACT OF THE DISCLOSURE

A liquid volume transducer in a method of hydrostatic testing of pressure vessels. The volume transducer comprises a liquid container having a constant cross-sectional area from top to bottom and provided with means for varying the volume of liquid in the container while providing a constant cross-sectional area and the same initial height of liquid. A pressure transducer is connected near the bottom of the container to indicate the change in pressure caused by a drop in height of liquid in the container when it is withdrawn through a liquid outlet. Because the liquid has a constant cross-sectional area from its surface to the bottom of the container the change in pressure is proportional to the volume of liquid withdrawn.

BACKGROUND OF THE INVENTION

In the hydrostatic testing of pressure vessels a substantially incompressible fluid, e.g. water is pumped, under pressure, into a fluid-filled test vessel to raise the internal pressure in the vessel. The quantity of fluid introduced into the vessel is directly proportional to the rise in pressure in said vessel until the elastic limit of the material which the vessel is constructed of has been reached. Beyond the elastic limit the quantity of fluid pumped and the rise in internal pressure are no longer directly proportional to one another.

During a non-destructive hydrostatic test the rise in pressure versus the volume of fluid pumped is monitored, for example, by recording the internal pressure versus quantity of fluid introduced into a fluid-filled vessel on a linographic recorder. A straight line is produced prior to the material of construction reaching its elastic limit. Beyond this elastic limit the line deviates in slope. This method provides a means for monitoring the condition of a vessel simultaneously with the introduction of the fluid. It is important in producing accurate results in testing vessels by this method that the volume of fluid pumped and the rise in pressure in the test vessel are precisely monitored. With present apparatus precision and accuracy of the plot can be detrimentally affected by one or more of the following: non-uniform pump rates; slippage in drive couplings between the pump and a recorder; faulty valve action of the pump and erroneous monitoring by weight transducers caused by external forces, such as wind and rain. In addition when weight transducing device is employed the testing apparatus must be considerably altered for the testing of vessels requiring a divergence in volumes of test liquid.

The present invention is directed to a novel apparatus and an improvement in the method for non-destructive testing of pressure vessels. The unique apparatus and method eliminate certain of the disadvantages which heretofore may have hampered such test operations.

SUMMARY OF THE INVENTION

The term "pressure vessel" as used herein, means closed or sealable containers of any shape which ordinarily are subjected to pressure in use and is meant to include gas storage cylinders, reactor tanks, pressure tubing and pipes, pipe lines, tank cars, storage tanks, boilers, boiler tubes, missile parts, combinations of the same and the other like vessels which may be subjected to elevated internal pressures.

The term "transducer" as used herein means a device actuated by power from one system and which supplies power in any other form to a second system.

The present volume transducer comprises a liquid container having means for varying the initial volume of test liquid while maintaining substantially identical initial height of a column of liquid in the container. The container and means for varying the volume are characterized in that they are constructed such that a column of liquid contained in said transducer has a constant cross-sectional area from the surface of the liquid to the bottom of the container. A pressure transducer is operatively connected to the lower portion of the container to measure the pressure and produce a signal which is proportional to the height of the column of liquid in the container. This pressure signal is then calibrated on a standard monitoring device to read the volume pumped.

In the practice of testing vessels the novel volume transducer is connected to a pump which in turn is connected to a vessel to be tested. During a test, liquid is pumped from the volume transducer into the test vessel. The height of the liquid in the volume transducer will drop with a corresponding proportional decrease in the pressure at the bottom of the container. This change in pressure is directly proportional to the decrease in volume of liquid and is detected by the pressure transducer and noted on a recorder or other comparison device. Since the pressure at the bottom of the container is dependent on the height of the column of liquid and not the volume of liquid in the container, the full scale of a pressure transducer can be used in each test while the actual volume of test liquid is changed. By using the full scale of the pressure transducer in each test a more precise indication of the actual volume of liquid introduced into the test vessel can be achieved.

In the hydrostatic testing of vessels the change in internal pressure of the vessel in relation to the volume of liquid introduced into the vessel corresponds essentially to the stress-strain relationship in the material of construction. A plot on a recorder of the volume of liquid introduced into the test vessel measured by the present volume transducer versus the change in pressure in the test vessel measured by a second pressure transducer connected to the vessel being tested, will indicate the relation of pressure versus volume and the exact condition of the test vessel can be monitored at each instance of time.

The present volume transducer, therefore, allows a more accurate indication of the volume of liquid introduced and can be adapted to various size vessels by merely changing the volume of liquid in the container.

BRIEF DESCRIPTION OF THE DRAWINGS

FIG. 1 represents schematically a pressure testing apparatus used in the method of the present invention with a pressure vessel attached thereto.

FIG. 2 represents an elevation, partly in section, of one embodiment of a volume transducer which may be used in the apparatus and method of the present invention.

FIG. 3 represents an elevation, partly in section of a second embodiment of a volume transducer which may be used in the apparatus and method of the present invention.

FIG. 4 represents a top plan of the transducer 10 shown in FIG. 3.

DETAILED DESCRIPTION OF THE INVENTION

Two embodiments of the novel volume transducer which may be used in the method of non-destructive testing are illustrated in FIGS. 2 through 4. The volume transducer comprises a container 10, in these embodiments a cylinder, having means 11 for changing the volume of liquid in the container, characterized in that the initial volume of liquid in the container can be varied while maintaining the same initial height of liquid in the container. The container 10 and means 11 are designed so that the liquid column has a constant cross-sectional area from its surface to the bottom of the container. This can be achieved by designing the container 10 and means 11 to have a constant cross-sectional area throughout the height of the container. This is necessary in order that the change in pressure in the height of the liquid as it is withdrawn will be directly proportional to the volume of liquid withdrawn. The container 10 is provided with a liquid inlet 12 and liquid outlet 13. A first pressure transducer 14 is operatively connected near the bottom of the container 10, to measure the pressure exerted by a column of liquid in the container.

As shown in FIG. 2 the means 11 can consist of concentric inner containers, in this embodiment cylinders varying in volume but being about equal to the height of the container 10. These inner containers are removably seated in the bottom of the container 10 to provide a liquid tight seal. Such means as threaded joints, flexible slip joints and the like can be employed to connect the means 11 to the inside bottom of the container 10. In FIG. 2, only one inner container is shown, however, any number may be employed, the number depending on the degree of variance in the volume of liquid desired.

The outlet 13 is connected, e.g. by tubing, hoses, etc., to a pump employed to introduce a test liquid into the vessel to be tested.

As shown in FIG. 1 the pump is connected by pipe, conduit or tubing to a pressure vessel undergoing the test. A second pressure transducer, schematically shown in FIG. 1, is adapted to the pressure vessel undergoing the test and also to the recorder. The first pressure transducer 14 of the volume transducer is also connected to the recorder. As test liquid is pumped from the volume transducer into the test vessel the pressure transducer 14 on the container 10 monitors the decrease in pressure in the container caused by the change in height of the liquid column, thus indicating the decrease in volume in the container and the corresponding volume of liquid introduced into the test vessel. This change in pressure is converted into a corresponding electrical, pneumatic or other like signal and is transmitted to the recorder, thus indicating the actual pressure and volume relationship during the test.

The volume transducer as described herein can be fabricated so that a wide range of liquid volumes can be monitored without requiring drastic changes in the testing equipment. In actual practice a volume transducer is usually provided for each particular size range of test vessels to be tested and preferably the volume of liquid in the container 10 is adjusted to approximately equal the volume of liquid required to test a particular size vessel. Thus, because the volume of liquid in the container 10 is adjusted to approximate the required amount of test liquid while maintaining the initial height of the liquid the same, the pressure at the bottom of the container is nearly the same and the full linear scale of the pressure transducer 14 can be employed during each test. This allows for a more accurate indication of the exact volume of liquid employed during each test, and eliminates different degrees of accuracy caused by a variation in the size of the test vessel or the need to change pressure transducers from one test to the next in order to assure accurate test results.

The volume of liquid, e.g. water in the container can be varied employing a variety of differently designed means 11. Other means 11 are shown in FIG. 3 comprising a series of sealed hollow or solid members which are inserted into the container 10 so as to replace a corresponding volume of liquid while maintaining the same initial height of liquid. As previously indicated the cross-sectional area of the liquid column must remain substantially constant over the useable height of the liquid column to insure that a given drop in pressure represents a proportional volume of liquid withdrawn from the container 10. It is appreciated that various other shaped means 11 may be employed to adjust the initial volume of liquid in the container 10, e.g. square rods and the like, however, it is important in the present invention that means 11 are employed which allow the initial height of the liquid to be maintained at the same level with a constant cross-sectional area for the entire column of liquid.

The pressure transducer 14 can be made up of a combination of a pressure detecting means and pressure analyzing means.

Pressure detecting means which can be utilized in the pressure transducer can be selected from a wide variety of such detectors including, for example, Bourdon-tube pressure gages, dead-weight piston gages, manganin wire pressure indicators, strain gages, piezo-electric crystals, differential transformers and manometers.

Useful pressure analyzers which can be employed are those which can translate and convert the impulse received from a given pressure detector into electrical, magnetic, mechanical or other optical equivalent thereof for further transmission to the second system, e.g. a recorder. Potentiometers with driving voltage, Wheatstone bridges, differential transformers and amplified photovoltaic devices are examples of particularly useful pressure analyzers.

The container 10 may be of other shapes than the cylindrical shape presented herein. However, whatever shape is employed it is important that the cross-sectional area of the container be substantially equal over the entire height of the volume of liquid employed therein at any given volume. Also, the container may be constructed in various sizes depending on the needs of the individual operators and the materials of construction can also be varied.

Various means may be provided for determining or assuring that the initial height of liquid in the container is the same for the start of each test after the pressure transducer 14 has been calibrated. For example a liquid column can be provided, e.g. transparent tubing, No. 15 in FIG. 3 which is marked at a predetermined height. Likewise the container can be provided with a liquid overflow, No. 16, FIG. 2, at some predetermined height in the container 10 or inner container 11. By the second method liquid is introduced into the container or inner container until it flows from the overflow thus indicating that a predetermined height of liquid is present in the container.

In the method of non-destructive testing a substantially incompressible liquid is pumped from a liquid supply container into the interior of a liquid-filled vessel thereby to increase the internal pressure within said vessel above the ambient pressure on said vessel. A graphic record of the resulting rise in pressure inside the vessel as a function of the quantity of liquid introduced into the vessel is made and the test usually terminated at the point where the pressure in said vessel no longer advances proportionally to the increase in volume of the liquid introduced into said vessel, i.e. at the elastic limit of the vessel, or at some predetermined test pressure. The present improvement in said method comprises detecting the volume of liquid introduced into the test vessel with the novel volume transducer as defined herein and noting this volume change on the recorder, or other comparison means.

The pump, second pressure transducer on the test vessel, recorder or other comparison means, and incompressible liquids suitable for use herein are those which are normally used in methods for the non-destructive testing of pressure vessels.

Recorders used in the method of the non-destructive testing can be, for example, conventional single or multipoint autographic line recorders, memory type oscilloscopes with attached camera or other photographic recording means and magnetic recorders. The selection of a given recorder for use in a specific embodiment of the non-destructive testing apparatus will be governed by the type of pressure transducer system used in the pressure testing method.

Typical useful pressure transducers for use on both the vessel and in the volume transducer and recorder assemblies are, for example, (1) a Bourdon-tube pressure gage, microtorque potentiometer with driving voltage and a Varian (0–10 m.v.) recorder; (2) a wire strain gage, Wheatstone bridge and Wheelco standard line recorder; (3) a piezoelectric crystal, with amplifier and a Leeds and Northrup single point recorder; (4) differential transformer and Brown recorder; (5) manometer, photovoltaic cell for following manometer fluid movement with change in pressure, amplifier and a Texas Instrument line recorder; (6) strain gage, Wheatstone bridge, amplifier and magnetic recorder; (7) manometer, with metallic fluid or having a piece of metal adapted to float on top of a non-metallic fluid, the manometer being centered within a coil (thus making a differential transformer assembly) and an autographic (X–Y) recorder; and (8) Bourdon-tube pressure gage, differential transformer and slow-acting memory type oscilloscope with attached camera.

The hydrostatic liquid utilized in the non-destructive testing methods can be any of a wide variety of liquids including, for example, water, silicon oils, petroleum distillates, mineral oils, synthetic high pressure lubricants, chlorinated hydrocarbons, fluorochloro-substituted hydrocarbons, low-boiling hydrocarbons, glycols and the like liquid materials.

Ordinarily, substantially incompressible liquids will be used as the hydrostatic test media as these provide the optimum degree of sensitivity to pressure changes within the test vessel.

The following example will facilitate a more complete understanding of the present invention.

EXAMPLE 1

A ICC–3A–2400 cylinder was tested in the following manner. The ICC–3A–2400 cylinder is a seamless steel pressure vessel 22″ O.D. by 34′4″ long and having a minimum wall thickness of .536″ having a capacity of approximately 75 cu. ft. The vessel was prepared for testing by connecting the outlet end with a vent line extending upwards on the inside to the cylinder wall. A valve was connected to the outer end of the vent for closing the cylinder off during the test. The vessel was inclined slightly so that the vent was the highest point in the cylinder. Water was introduced at the inlet end of the vessel and filling continued until the vent line was flowing water. In this manner the residual air trapped in the vessel was minimized.

Once the vessel was filled, a flexible high pressure line filled with water and connected by means of quick couplings was attached to the vessel and to the outlet of a 4-piston positive displacement variable speed pump capable of delivering 2.1 gal./min. at 6800 p.s.i.g. At the outlet end of the vessel, a pressure sensing transducer, 0–5000 p.s.i. Dynisco, was connected into the system to sense the pressure on the vessel. The electrical output of the transducer was connected to the ordinate axis of an electro Instrument Model 500 XY recorder.

The inlet of the positive displacement pump was connected to a volume transducer which comprised a container 8″ in diameter by 60″ in height and which had a constant volume cross-sectional area over its height. At the base of the water column a Foxboro differential pressure transducer was connected to measure the height of water electrically. The electrical output of this transducer was connected to the abscissa of the XY recorder. The container contained an overflow outlet near the upper portion thereof to indicate when the height of liquid was at a predetermined level. The container was filled with water until the water drained from the overflow. This container contained about 48 liters of test water when filled to the overflow level.

The column was calibrated against the recorder chart to deliver 2.3898 liters per 5 small chart divisions. The pressure transducer on the pressure vessel was dead weight tested and adjusted electrically to register 1000 p.s.i. per 40 divisions. This calibration produced a line on the recorder which had a slope of about 60°.

The pump was started and the pressure-volume line on the recorder was generated. A test pressure of 4000 p.s.i.g. was required so the test was terminated at 4000 p.s.i.g. The line on the chart was still progressing in linear relationship at this pressure, indicating that the vessel had not exceeded its elastic limit at the test pressure.

The total volume pumped into the vessel was equal to about 35.8 liters.

In testing smaller vessels solid bars about 60″ long are inserted into the container to reduce the volume of liquid to approximately the volume required to test the vessel.

What is claimed is:

1. A volume transducer which comprises:
   (a) a liquid container having a constant cross-sectional area from top to bottom, being provided with means for varying the volume of a liquid in said container while maintaining substantially the same initial height of a liquid in said container, said means having a constant cross-sectonal area from top to bottom and being provided in said container in such a manner that a liquid in the container will have a constant cross-sectional area from the surface of the liquid to the bottom of the container, said container further provided with a liquid inlet and a liquid outlet said liquid outlet being located near the bottom of the container, and
   (b) a pressure transducer operatively connected near the bottom of the container to indicate the pressure exerted by a liquid column in said container having a constant cross-sectional area from the surface thereof to the bottom of said container.

2. The volume transducer as defined in claim 1 wherein said container is provided with a liquid height indicator.

3. The volume transducer as defined in claim 1 wherein said pressure transducer produces a signal proportional to the height of liquid in the container.

4. The volume transducer as defined in claim 1 wherein said means for varying the volume of liquid in the liquid container comprises at least one removeable inner container seated in the bottom of the liquid container to form a liquid tight seal, said inner container having a constant cross-sectional area over at least the length of a liquid column to be placed therein, said liquid outlet is located in the bottom of said container so as to provide an outlet for a liquid in said inner container, and said pressure transducer is operatively connected to the bottom of said liquid container in a manner to monitor the pressure exerted by a column of liquid maintained in said inner container.

5. The volume transducer as defined in claim 1 wherein said means for varying the volume of a liquid in said container comprises liquid displacing members having a constant cross-sectional area from top to bottom.

6. In an apparatus for the non-destructive testing of pressure vessels including a pump for the delivery of liquids under pressure, a recorder, a liquid supply source communicating with said pump, a pressure transducer connected to a vessel being tested and to said recording device, a volume transducer connected to said recorder and liquid supply, said pump connected to the liquid supply source and to a test vessel, the improvement which comprises a volume transducer comprising:

(a) a liquid container having a constant cross-sectional area from top to bottom, being provided with means for varying volume of a liquid in said container while maintaining the same initial height of liquid in said container, said means having a constant cross-sectional area from top to bottom and being provided in said container in such a manner that liquid in the container will have a constant cross-sectional area from the surface of the liquid to the bottom of the container, said container further provided with a liquid inlet and a liquid outlet said liquid outlet being located near the bottom of the container, and (b) a pressure transducer operatively connected near the bottom of the container to indicate the pressure exerted by a liquid column having a constant cross-sectional area from the surface thereof to the bottom in said container.

7. The apparatus as defined in claim 6 wherein the container contains a volume of liquid about equal to the volume of liquid required to test the vessel.

References Cited
UNITED STATES PATENTS

| | | | |
|---|---|---|---|
| 3,230,760 | 1/1966 | Fryer, Jr. et al. | 73—37 |
| 3,365,933 | 1/1968 | Jorgensen et al. | 73—37 |

LOUIS R. PRINCE, Primary Examiner

W. A. HENRY, Assistant Examiner